(12) United States Patent
Hilgendorff (10) Patent No.: US 8,784,759 B2
(45) Date of Patent: Jul. 22, 2014

(54) NOX STORAGE CATALYST WITH REDUCED RH LOADING

(75) Inventor: Marcus Hilgendorff, Hannover (DE)

(73) Assignee: BASF SE, Ludwigshafen (DE)

( * ) Notice: Subject to any disclaimer, the term of this patent is extended or adjusted under 35 U.S.C. 154(b) by 310 days.

(21) Appl. No.: 13/156,886

(22) Filed: Jun. 9, 2011

(65) Prior Publication Data

US 2011/0305615 A1      Dec. 15, 2011

Related U.S. Application Data

(60) Provisional application No. 61/353,242, filed on Jun. 10, 2010.

(51) Int. Cl.

| | | |
|---|---|---|
| B01D 53/34 | (2006.01) |
| B01D 53/56 | (2006.01) |
| B01D 53/94 | (2006.01) |
| B01D 50/00 | (2006.01) |
| B01J 8/02 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01G 28/00 | (2006.01) |
| C01G 30/00 | (2006.01) |
| F01N 3/10 | (2006.01) |
| B01J 23/00 | (2006.01) |
| B01J 23/02 | (2006.01) |
| B01J 23/08 | (2006.01) |
| B01J 23/10 | (2006.01) |
| B01J 23/40 | (2006.01) |
| B01J 23/42 | (2006.01) |
| B01J 23/44 | (2006.01) |
| B01J 23/56 | (2006.01) |
| B01J 23/58 | (2006.01) |
| B01J 21/04 | (2006.01) |

(52) U.S. Cl.
USPC ........ 423/213.5; 502/302; 502/303; 502/304; 502/326; 502/327; 502/328; 502/330; 502/332; 502/333; 502/334; 502/339; 502/349; 502/355; 502/415; 502/439; 502/527.12; 502/527.13; 422/170; 422/177; 422/180; 60/299

(58) Field of Classification Search
USPC ......... 502/302–304, 326–328, 330, 332–334, 502/339, 349–351, 355, 415, 439, 527.12, 502/527.13; 423/213.5; 60/299; 422/170, 422/177, 180
See application file for complete search history.

(56) References Cited

U.S. PATENT DOCUMENTS

| 4,923,842 | A * | 5/1990 | Summers | 502/261 |
|---|---|---|---|---|
| 5,597,771 | A * | 1/1997 | Hu et al. | 502/304 |
| 6,080,375 | A * | 6/2000 | Mussmann et al. | 423/213.5 |
| 6,087,298 | A * | 7/2000 | Sung et al. | 502/333 |
| 6,413,904 | B1 * | 7/2002 | Strehlau et al. | 502/328 |
| 6,514,905 | B1 * | 2/2003 | Hanaki et al. | 502/328 |
| 6,677,264 | B1 * | 1/2004 | Klein et al. | 502/74 |
| 6,777,370 | B2 * | 8/2004 | Chen | 502/241 |
| 6,864,214 | B2 * | 3/2005 | Uenishi et al. | 502/304 |
| 6,967,186 | B2 * | 11/2005 | Takaya et al. | 502/325 |
| 7,081,430 | B2 * | 7/2006 | Uenishi et al. | 502/327 |
| 7,576,031 | B2 * | 8/2009 | Beutel et al. | 502/339 |
| 7,674,743 | B2 * | 3/2010 | Gandhi et al. | 502/302 |
| 7,749,472 | B2 * | 7/2010 | Chen et al. | 423/213.2 |
| 7,906,449 | B2 * | 3/2011 | Ando et al. | 502/66 |
| 7,981,390 | B2 * | 7/2011 | Galligan et al. | 423/213.5 |
| 8,153,549 | B2 * | 4/2012 | Cho et al. | 502/327 |
| 8,252,258 | B2 * | 8/2012 | Muller-Stach et al. | 423/213.2 |
| 8,475,752 | B2 * | 7/2013 | Wan | 423/213.2 |
| 8,496,899 | B2 * | 7/2013 | Imai | 423/239.1 |
| 2003/0021745 | A1 * | 1/2003 | Chen | 423/239.1 |
| 2004/0151645 | A1 | 8/2004 | Li | |
| 2004/0198595 | A1 * | 10/2004 | Chen | 502/328 |
| 2005/0164879 | A1 * | 7/2005 | Chen | 502/328 |
| 2005/0282701 | A1 | 12/2005 | Foong et al. | |
| 2010/0212293 | A1 * | 8/2010 | Deeba et al. | 60/274 |
| 2010/0257843 | A1 * | 10/2010 | Hoke et al. | 60/274 |
| 2011/0305612 | A1 * | 12/2011 | Muller-Stach et al. | 423/212 |

FOREIGN PATENT DOCUMENTS

| | | |
|---|---|---|
| JP | 2005205302 | 8/2005 |
| WO | WO-2008/067375 | 6/2008 |
| WO | WO-2010/012677 | 2/2010 |

OTHER PUBLICATIONS

PCT IPRP & Written Opinion in PCT/IB2011/052511, mailed Dec. 20, 2012, 8 pgs.

PCT International Search Report in PCT/IB2011/052511, mailed Oct. 20, 2011, 3 pgs.

* cited by examiner

*Primary Examiner* — Cam N. Nguyen (74) *Attorney, Agent, or Firm* — Servilla Whitney LLC (57) ABSTRACT

The present invention relates to a nitrogen oxide storage catalyst comprising:

a substrate;

a first washcoat layer disposed on the substrate, the first washcoat layer comprising metal oxide support particles and a nitrogen oxide storage material comprising at least one metal compound selected from the group consisting of alkaline earth metal compounds, alkali metal compounds, rare earth metal compounds, and mixtures thereof, at least a portion of said at least one metal compound being supported on the metal oxide support particles; and a second washcoat layer disposed over the first washcoat layer, said second washcoat layer comprising Rh, wherein the first washcoat layer contains substantially no Rh, and wherein the second washcoat layer is disposed on 100-x % of the surface of the first washcoat layer, x ranging from 20 to 80.

28 Claims, 6 Drawing Sheets

NOX STORAGE CATALYST WITH REDUCED RH LOADING

CROSS-REFERENCE TO RELATED APPLICATIONS

This application claims the benefit of priority under 35 U.S.C. §119(e) to U.S. Patent Application No. 61/353,242, filed Jun. 10, 2010, which is hereby incorporated by reference in its entirety.

TECHNICAL FIELD

Aspect of the present invention relates to an NOx trap with a reduced Rh loading and to a method for the production of an NOx trap with a reduced Rh loading, as well as to a treatment system for an automobile exhaust gas stream and to a method for the treatment of automobile engine exhaust gas.

BACKGROUND

The emission of nitrogen oxides ("$NO_x$") from lean-burn engines must be reduced in order to meet emission regulation standards. Conventional three-way conversion ("TWC") automotive catalysts are suitable for abating $NO_x$, carbon monoxide ("CO") and hydrocarbon ("HC") pollutants in the exhaust of engines operated at or near stoichiometric air/fuel conditions.

Engines, especially gasoline-fueled engines, are being designed to operate under lean conditions as a fuel economy measure. Such engines are referred to as "lean-burn engines". That is, the ratio of air to fuel in the combustion mixtures supplied to such engines is maintained considerably above the stoichiometric ratio so that the resulting exhaust gases are "lean", i.e., the exhaust gases are relatively high in oxygen content.

Although lean-burn engines provide enhanced fuel economy, they have the disadvantage that conventional TWC catalysts are not effective for reducing $NO_x$ emissions from such engines because of excessive oxygen in the exhaust. Attempts to overcome this problem have included operating lean-burn engines with brief periods of fuel-rich operation (engines which operate in this fashion are sometimes referred to as "partial lean-burn engines"). The exhaust of such engines is treated with a catalyst/$NO_x$ sorbent (nitrogen oxide storage catalyst) which stores $NO_x$ during periods of lean (oxygen-rich) operation, and releases the stored $NO_x$ during the rich (fuel-rich) periods of operation. During periods of rich (or stoichiometric) operation, the catalyst component of the catalyst/$NO_x$ sorbent promotes the reduction of $NO_x$ to nitrogen by reaction of $NO_x$ (including $NO_x$ released from the $NO_x$ sorbent) with HC, CO and/or hydrogen present in the exhaust gas.

WO 2008/067375, for example, discloses a nitrogen oxide storage catalyst having a washcoat layer provided on a substrate, wherein said washcoat layer contains Rh and further elements which form a composition which are active in the abatement of nitrogen oxide by trapping and conversion thereof.

There, however, remains a need for improved nitrogen oxide storage catalysts, in particular with respect to the efficiency in the abatement of nitrogen oxide at lower temperatures, i.e. during the cold-start periods of automotive exhaust gas treatment. Furthermore, in view of the costly platinum group metals contained in nitrogen oxide storage catalysts, there is a need to reduce the amounts thereof which are necessary for meeting emission regulation standards.

SUMMARY

The present invention includes the following embodiments, wherein these include the specific combinations of embodiments as indicated by the respective interdependencies defined therein:

Embodiment 1: A nitrogen oxide storage catalyst comprising:
a substrate;
a first washcoat layer disposed on the substrate, the first washcoat layer comprising metal oxide support particles and a nitrogen oxide storage material comprising at least one metal compound selected from the group consisting of alkaline earth metal compounds, alkali metal compounds, rare earth metal compounds, and mixtures thereof, at least a portion of said at least one metal compound being supported on the metal oxide support particles; and
a second washcoat layer disposed over the first washcoat layer, said second washcoat layer comprising Rh,
wherein the first washcoat layer contains substantially no Rh, and
wherein the second washcoat layer is disposed on 100-x % of the surface of the first washcoat layer, x ranging from 20 to 80, preferably from 25 to 75, more preferably from 30 to 70, more preferably from 35 to 65, more preferably from 40 to 60, more preferably from 45 to 55, and even more preferably from 48 to 52, wherein preferably the first and second washcoat layers are both disposed on the substrate starting from one end and/or side of the substrate body, and wherein more preferably the second washcoat layer is a continuous layer.

Embodiment 2: The nitrogen oxide storage catalyst according to embodiment 1, wherein the second washcoat layer further comprises metal oxide support particles on which Rh is at least partially supported.

Embodiment 3: The nitrogen oxide storage catalyst according to embodiment 1 or 2, wherein the metal oxide support particles comprise at least one metal oxide selected from the group consisting of alumina, zirconia, zirconia-alumina, baria-alumina, lanthana-alumina, lanthana-zirconia-alumina, and mixtures thereof, preferably wherein the metal oxide particles comprise zirconia-alumina and/or lanthana-alumina, more preferably zirconia-alumina.

Embodiment 4: The nitrogen oxide storage catalyst according to any one of embodiments 1 to 3, wherein the nitrogen oxide storage material comprises at least one element selected from the group consisting of Li, Na, K, Rb, Cs, Mg, Ca, Sr, Ba, Ce, La, Pr, Nd, and mixtures thereof, preferably at least one element selected from the group consisting of Mg, Ba, Ce, and mixtures thereof, more preferably Ba and/or Ce.

Embodiment 5: The nitrogen oxide storage catalyst according to any one of embodiments 1 to 4, wherein the nitrogen oxide storage material comprises a cerium compound and a barium compound, preferably ceria and barium carbonate, preferably in a ceria:barium carbonate weight ratio of from 1:1 to 1:20, more preferably of from 1:2 to 1:15, more preferably of from 1:3 to 1:10, and even more preferably of from 1:3.5 to 1:5.

Embodiment 6: The nitrogen oxide catalyst according to embodiment 5, wherein barium carbonate is at least partially supported on particles comprising ceria, wherein the resulting particles preferably have a particle size (d90) which ranges from 5 to 20 µm, preferably from 8 to 14 µm, more preferably from 9 to 13 µm, and even more preferably from 10 to 12 µm.

Embodiment 7: The nitrogen oxide storage catalyst according to any one of embodiments 1 to 6, wherein the first washcoat layer further comprises at least one platinum group metal selected from the group consisting of platinum, palladium, iridium, and mixtures thereof, wherein the at least one platinum group metal is preferably at least partially supported on the metal oxide support particles, more preferably wherein different types of platinum group metals are supported on separate metal oxide support particles.

Embodiment 8: The nitrogen oxide storage catalyst according to embodiment 7, wherein the first washcoat layer comprises Pd and/or Pt, preferably Pd and Pt.

Embodiment 9: The nitrogen oxide storage catalyst according to any one of embodiments 1 to 8, wherein the nitrogen oxide storage catalyst further comprises a third washcoat layer which comprises Pd and which is disposed onto at least a portion of the first washcoat layer, onto which the second washcoat layer is not disposed.

Embodiment 10: The nitrogen oxide storage catalyst according to embodiment 9, wherein Pd comprised in the third washcoat layer is at least partially supported on metal oxide support particles, wherein the metal oxide support particles preferably comprise at least one metal oxide selected from the group consisting of alumina, zirconia, zirconia-alumina, baria-alumina, lanthana-alumina, lanthana-zirconia-alumina, and mixtures thereof, more preferably, wherein the metal oxide support particles comprise zirconia-alumina and/or lanthana-alumina, and even more preferably zirconia-alumina.

Embodiment 11: The nitrogen oxide storage catalyst according to any one of embodiments 1 to 10, wherein the substrate comprises a honeycomb substrate comprising a plurality of longitudinally extending passages formed by longitudinally extending walls bounding and defining said passages,
wherein the honeycomb substrate preferably comprises alternating inlet and outlet passages, said inlet passages having an open inlet end and a closed outlet end, and said outlet passages having a closed inlet end and an open outlet end.

Embodiment 12: The nitrogen oxide catalyst according to embodiment 11, wherein the first washcoat layer onto 100-x % of the surface of which the second washcoat layer is disposed is the first washcoat layer of the of the inlet passages of the honeycomb substrate, wherein the second washcoat layer is preferably disposed on the first portion of said first washcoat layer extending from the inlet end of the honeycomb substrate (front section), wherein more preferably the second washcoat layer is a continuous layer.

Embodiment 13: The nitrogen oxide catalyst according to embodiment 11 or 12, wherein the nitrogen oxide storage catalyst comprises a third washcoat layer according to embodiment 9 or 10, and wherein the first washcoat layer onto the surface of which the third washcoat layer is disposed is the first washcoat layer of the of the outlet passages of the honeycomb substrate, said third washcoat layer being disposed on at least a portion of said first washcoat layer of the outlet passages of the honeycomb substrate.

Embodiment 14: A treatment system for an automobile exhaust gas stream, comprising:
a combustion engine which operates periodically between lean and rich conditions;
an exhaust gas conduit in communication with the engine; and
a nitrogen oxide storage catalyst according to any of embodiments 1 to 13 provided within the exhaust gas conduit.

Embodiment 15: The treatment system according to embodiment 14, wherein the nitrogen storage catalyst comprises separate substrates with respect to the portions or sections of the catalyst which comprise the second washcoat layer, and those which do not comprise the second washcoat layer, preferably wherein according to any one of embodiments 9 to 13 the nitrogen storage catalyst comprises separate substrates with respect to the portions or sections of the catalyst which comprise the second washcoat layer, and those which comprise the third washcoat layer.

Embodiment 16: A method for the treatment of automobile engine exhaust gas comprising:
(i) providing a nitrogen oxide storage catalyst according to any one of embodiments 1 to 13, and
(ii) conducting an automobile engine exhaust gas stream over and/or through the nitrogen oxide storage catalyst.

Embodiment 17: The method according to embodiment 16, wherein the automobile engine operates periodically between lean and rich conditions.

Embodiment 18: A method of producing a nitrogen oxide storage catalyst comprising the steps of:
(i) providing a substrate, preferably a honeycomb substrate;
(ii) providing a first washcoat layer on said substrate, said first washcoat layer comprising metal oxide support particles and at least one metal compound selected from the group consisting of alkaline earth metal compounds, alkali metal compounds, rare earth metal compounds, and mixtures thereof, at least a portion of said at least one metal compound being supported on the metal oxide support particles;
(iii) drying and/or calcining the coated substrate;
(iv) providing a second washcoat layer comprising Rh on 100-x % of the surface of the first washcoat layer, wherein x ranges from 20 to 80, preferably from 25 to 75, more preferably from 30 to 70, more preferably from 35 to 65, more preferably from 40 to 60, more preferably from 45 to 65, and even more preferably from 48 to 52;
(v) drying and/or calcining the coated substrate.

Embodiment 19: The method of embodiment 18, further comprising the steps of:
(vi) providing a third washcoat layer onto at least a portion of the surface of the first washcoat layer, onto which the second washcoat layer has not been provided;
(vii) drying and/or calcining the coated substrate;
wherein alternatively, steps (vi) and (vii) are conducted after step (iii) and prior to step (iv).

Embodiment 20: The method according to embodiment 18 or 19, wherein step (ii) comprises the steps of:
(a) mixing a solution of the at least one metal compound with particles of at least one metal compound;
(b) drying and/or calcining the mixture to obtain a composite material;
(c) impregnating metal oxide support particles with a solution comprising Pt;
(d) impregnating metal oxide support particles with a solution comprising Pd;
(e) providing and milling a slurry of the particles obtained in steps (c) and (d);
(f) providing a slurry comprising the milled particles obtained in step (e) and the composite material obtained in step (b) and milling the resulting mixture;
(g) coating the substrate with the slurry obtained in step (f).

Embodiment 21: The method according to any one of embodiments 18 to 20, wherein step (iv) comprises the steps of:

(aa) impregnating metal oxide support particles with a solution comprising Rh;
(bb) providing and milling a slurry of the impregnated particles;
(cc) coating the substrate with the slurry obtained in step (bb).

Embodiment 22: The method according to any one of embodiments 19 to 21, wherein step (vi) comprises the steps of:
(dd) impregnating metal oxide support particles with a solution comprising Pd;
(ee) providing and milling a slurry of the impregnated particles;
(ff) coating the substrate with the slurry obtained in step (ee).

Embodiment 23: The method according to any one of embodiments 19 to 22,
wherein the substrate is a honeycomb substrate, and wherein the method preferably comprises a further step of:
(viii) alternatively closing the inlet our outlet ends of the honeycomb substrate to form inlet passages having an open inlet end and a closed outlet end, and outlet passages having a closed inlet end and an open outlet end.

Embodiment 24: The method according to embodiment 22 or 23, wherein in steps (e), (f), (bb) and/or (ee) the slurry is milled to a particle size (d90) ranging from 5 to 20 μm, preferably from 8 to 14 μm, more preferably from 9 to 13 μm, and even more preferably from 10 to 12 μm.

Embodiment 25: The method according to any one of embodiments 22 to 24, wherein in steps (c), (d), (aa) and/or (dd) the metal oxide support particles are impregnated by an incipient wetness procedure.

Embodiment 26: The method according to any one of embodiments 22 to 25, wherein in steps (g), (cc) and/or (ff) the coating is performed by dip coating.

Embodiment 27: The method according to any one of embodiments 20 to 26, wherein the slurry in step (f) contains substantially no Rh.

Embodiment 28: A nitrogen oxide storage catalyst obtainable according to a method according to any one of embodiments 18 to 27.

BRIEF DESCRIPTION OF THE DRAWINGS

FIG. 1 is a graph comparing the percent NOx conversion as a function of the temperature in ° C. for selected examples of the description, wherein the NOx tailpipe trigger was set to 100 ppm. In FIG. 1, "♦" represents the values obtained for Comparative Example 1, "■" stands for the values obtained for Example 2, and "▲" stands for the values obtained for Example 3.

FIG. 2 is a graph comparing the NOx storage in cycle 10 after 9 lean/rich cycles with a lean NOx trigger set to 100 ppm as a function of the temperature in ° C. for selected examples of the description, wherein the NOx tailpipe trigger was set to 100 ppm. In FIG. 2, "♦" stands for the values obtained for Comparative Example 1, "■" stands for the values obtained for Example 2, "▲" stands for the values obtained for Example 3, and "NOx Storage Cycle 10/g" stands for the NOx Storage Efficiency in g/L.

FIG. 3 is a graph comparing the percent NOx conversion as a function of the temperature in ° C. for selected examples of the description, wherein the NOx tailpipe trigger was set to 100 ppm. In FIG. 3, "▲" stands for the values obtained for Comparative Example 1, and "■" stands for the values obtained for Example 4.

FIG. 4 is a graph comparing the NOx storage in cycle 10 after 9 lean/rich cycles with a lean NOx trigger set to 100 ppm as a function of the temperature in ° C. for selected examples of the description, wherein the NOx tailpipe trigger was set to 100 ppm. In FIG. 4, "▲" stands for the values obtained for Comparative Example 1, "■" stands for the values obtained for Example 4, and "NOx Storage Cycle 10/g" stands for the NOx Storage Efficiency in g/L.

FIG. 5 is a graph comparing the percent NOx conversion as a function of the temperature in ° C. for selected examples of the description, wherein the NOx tailpipe trigger was set to 40 ppm. In FIG. 5, "■" stands for the values obtained for Comparative Example 1, and "♦" stands for the values obtained for Example 4.

FIG. 6 is a graph comparing the NOx storage in cycle 10 after 9 lean/rich cycles with a lean NOx trigger set to 40 ppm as a function of the temperature in ° C. for selected examples of the description, wherein the NOx tailpipe trigger was set to 40 ppm. In FIG. 6, "■" stands for the values obtained for Comparative Example 1, "♦" stands for the values obtained for Example 4, and "NOx Storage Cycle 10/g" stands for the NOx Storage in cycle 10 in g/L.

DETAILED DESCRIPTION

In this respect, it has surprisingly been found that a NOx storage catalyst design according to embodiments of the present invention which involves lower loadings of platinum group metals, in particular of Rh, affords improved performance with respect to the abatement of nitrogen oxide, especially during the cold-start period of the exhaust treatment process.

Thus, an embodiment of the present invention relates to a nitrogen oxide storage catalyst comprising:
a substrate;
a first washcoat layer disposed on the substrate, the first washcoat layer comprising metal oxide support particles and a nitrogen oxide storage material comprising at least one metal compound selected from the group consisting of alkaline earth metal compounds, alkali metal compounds, rare earth metal compounds, and mixtures thereof, at least a portion of said at least one metal compound being supported on the metal oxide support particles; and
a second washcoat layer disposed over the first washcoat layer, said second washcoat layer comprising Rh,
wherein the first washcoat layer contains substantially no Rh, and
wherein the second washcoat layer is disposed on 100-x % of the surface of the first washcoat layer, x ranging from 20 to 80.

As the substrate, any material may be used provided that it may support the washcoat layers of the nitrogen oxide storage catalyst and that it is resistant to the conditions which reign during the exhaust gas treatment process. Suitable substrates include any of those materials typically used for preparing catalysts, and will usually comprise a ceramic or metal honeycomb structure.

The substrate according to embodiments of the present invention may be of any conceivable shape, provided that it allows for the fluid contact with at least a portion of the washcoat layers present thereon. Preferably, the substrate is a monolith, wherein more preferably the monolith is a flow-through monolith. Accordingly, the monolithic substrate preferably contains fine, parallel gas flow passages extending from an inlet to an outlet face of the substrate, such that passages are open to fluid flow. Such substrates are commonly referred to as honeycomb flow through substrates. The passages, which are essentially straight paths from their fluid inlet to their fluid outlet, are defined by walls on which the washcoats are disposed, so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, or circular. Such structures may contain from 60 to 400 or more gas inlet openings (i.e., cells) per square inch of cross section.

Thus according to a preferred embodiment of the present invention, the nitrogen oxide storage catalyst comprises a monolith as the substrate, preferably a flow-through monolith, and more preferably a flow-through monolith having a honeycomb-structure.

The substrate can be made from materials commonly known in the art. For this purpose, porous materials are preferably used as the substrate material, in particular ceramic and ceramic-like materials such as cordierite, α-alumina, an aluminosilicate, cordierite-alumina, silicon carbide, aluminum titanate, silicon nitride, zirconia, mullite, zircon, zircon mullite, zircon silicate, sillimanite, a magnesium silicate, petalite, spodumene, alumina-silica-magnesia and zirconium silicate, as well as porous refractory metals and oxides thereof. According to embodiments of the present invention, "refractory metal" refers to one or more metals selected from the group consisting of Ti, Zr, Hf, V, Nb, Ta, Cr, Mo, W, and Re. The substrate may also be formed of ceramic fiber composite materials. According to the present invention, the substrate is preferably formed from cordierite, silicon carbide, and/or from aluminum titanate. In general, materials are preferred which are able to withstand the high temperatures to which a NOx storage catalyst is exposed to, in particular when used in the treatment of automotive exhaust gas.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt.-% of the alloy, e.g., 10-25 wt.-% of chromium, 3-8 wt.-% of aluminum and up to 20 wt.-% of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the subsequent adherence of the washcoat compositions to the substrate.

In principle, any metal oxide support particles may be used in the first washcoat layer, provided that they can withstand the conditions encountered during the treatment of automotive exhaust gas, in particular with respect to the temperatures incurred by the NOx storage catalyst. Preferably, the metal oxide support particles comprise at least one metal oxide selected from the group consisting of alumina, zirconia, zirconia-alumina, baria-alumina, lanthana-alumina, lanthana-zirconia-alumina, and mixtures thereof. More preferably, the metal oxide particles comprise zirconia-alumina and/or lanthana-alumina, even more preferably zirconia-alumina.

According to preferred embodiments of the present invention, the metal oxide support particles comprised in the first washcoat layer may be doped with one or more compounds. Thus, the metal oxide support particles, preferably alumina, comprised in the first washcoat layer are preferably doped with zirconia. In principle, the metal oxide support particles may be doped with any possible amount of zirconia, preferably with 0.5 to 40% zirconia, more preferably with from 1 to 30%, more preferably with from 5 to 25%, and even more preferably with from 10 to 20%.

According to embodiments of the present invention, the particle size ($d_{90}$) of the metal oxide support particles comprised in the first washcoat layer preferably ranges from 5 to 20 μm, more preferably from 8 to 14 μm, more preferably from 9 to 13 μm, and even more preferably from 10 to 12 μm. Within the meaning of the present invention a particle size "$d_{90}$" refers to the equivalent diameter where 90% of the number of particles per volume have a smaller diameter.

Furthermore, according to embodiments of the present invention, the surface area of the metal oxide support particles may range from 50 to 350 $m^2/g$, wherein preferably, the surface area ranges from 100 to 300 $m^2/g$, more preferably from 130 to 270 $m^2/g$, more preferably from 150 to 230 $m^2/g$, and even more preferably from 170 to 190 $m^2/g$. Within the meaning of the present invention, the surface area generally refers to the BET surface area, preferably to the BET surface area determined according to DIN 66135.

Regarding the nitrogen oxide storage material comprised in the first washcoat layer, it is further preferred that said material comprises at least one element selected from the group consisting of Li, Na, K, Rb, Cs, Mg, Ca, Sr, Ba, Ce, La, Pr, Nd, and mixtures thereof, preferably at least one element selected from the group consisting of Mg, Ba, Ce, and mixtures thereof, more preferably Ba and/or Ce.

According to a particularly preferred embodiment, the nitrogen oxide storage material comprises a cerium compound and a barium compound, preferably ceria and barium carbonate, wherein the ceria:barium carbonate weight ratio preferably ranges from 1:1 to 1:20, more preferably of from 1:2 to 1:15, more preferably of from 1:3 to 1:10, and even more preferably of from 1:3.5 to 1:5.

With respect to said particularly preferred embodiment, barium carbonate is preferably at least partially supported on particles comprising ceria, wherein the resulting particles preferably have a particle size ($d_{90}$) which ranges from 5 to 20 μm, more preferably from 8 to 14 μm, more preferably from 9 to 13 μm, and even more preferably from 10 to 12 μm.

In general, the nitrogen oxide storage material may have any possible surface area, wherein according to a preferred embodiment, the surface area of the nitrogen oxide storage material ranges from 25 to 100 $m^2/g$, more preferably from 30 to 80 $m^2/g$, more preferably from 40 to 60 $m^2/g$, and even more preferably from 45 to 55 $m^2/g$.

According to embodiments of the present invention, it is further preferred that the first washcoat layer comprises at least one platinum group metal selected from the group consisting of platinum, palladium, iridium, and mixtures thereof. Preferably, the at least one platinum group metal is at least partially supported on the metal oxide support particles, wherein more preferably, different types of platinum group metals are supported on separate metal oxide support particles. In particular, it is preferred that the first washcoat layer comprises Pd and/or Pt, preferably Pd and Pt.

In preferred embodiments of the present invention wherein the nitrogen oxide storage catalyst comprises Pd, it is further preferred that the total loading of Pd in the catalyst ranges from 5 to 25 g/$ft^3$. More preferably, the total loading of Pd in the nitrogen oxide storage catalyst ranges from 8 to 20 g/ft$^3$, more preferably from 10 to 17 g/ft$^3$, more preferably from 11 to 16 g/ft$^3$, more preferably from 12 to 15 g/ft$^3$, and even more preferably from 13 to 14 g/ft$^3$ Furthermore, in preferred embodiments of the present invention, wherein the nitrogen oxide storage catalyst comprises Pt, it is further preferred that the total loading of Pt in the catalyst is ranges from 5 to 200 g/ft$^3$. More preferably, the total loading of Pt in the nitrogen oxide storage catalyst ranges from 20 to 150 g/ft$^3$, more preferably from 40 to 120 g/ft$^3$, more preferably from 50 to 100 g/ft$^3$, more preferably from 60 to 80 g/ft$^3$, and even more preferably from 65 to 75 g/ft$^3$.

Concerning the total loading of the first washcoat layer according to embodiments of the present invention, any possible loading may be chosen in principle. In general, the loading of the first washcoat layer in the nitrogen oxide storage catalyst may range from 0.5 to 20 g/in$^3$, wherein the loading preferably ranges from 1 to 15 g/in$^3$, more preferably from 3 to 10 g/in$^3$, more preferably from 4 to 8 g/in$^3$, more preferably from 5 to 7 g/in$^3$, and even more preferably from 5.5 to 6.0 g/in$^3$.

According to embodiments of the present invention, the first washcoat layer of the nitrogen oxide storage catalyst comprises substantially no Rh. Within the meaning of the present invention, a material is preferably defined as not comprising a substantial amount of a specific element when it contains 0.001 wt.-% or less of said element, preferably 0.0005 wt.-% or less, more preferably 0.00001 wt.-% or less, more preferably 0.000005 wt.-% or less, and even more preferably 0.000001 wt.-% or less thereof.

Regarding the second washcoat layer, said layer is disposed on 100-x % of the surface of the first washcoat layer, wherein x ranges from 20 to 80, x preferably ranging from 25 to 75, more preferably from 30 to 70, more preferably from 35 to 65, more preferably from 40 to 60, more preferably from 45 to 55, and even more preferably from 48 to 52.

According to the nitrogen oxide storage catalyst of the present invention, the washcoat layers are provided on the substrate in any conceivable fashion, wherein the first and second washcoat layers are preferably both disposed on the substrate starting from one end and/or side of the substrate body. According to a particularly preferred embodiment, said layers are provided on the substrate as continuous layers, wherein a continuous layer according to the present invention preferably refers to a layer which is uninterrupted along its entire length.

In general, the loading of Rh in the second washcoat layer may have any possible value, wherein the loading may range from 0.5 to 10 g/ft$^3$. According to a preferred embodiment, the loading of Rh in the second washcoat layer ranges from 1 to 8 g/ft$^3$, more preferably from 2 to 6 g/ft$^3$, more preferably from 2.5 to 5.5 g/ft$^3$, more preferably from 3 to 5 g/ft$^3$, and even more preferably from 3.5 to 4.5 g/ft$^3$.

Regarding the total loading of Rh in the nitrogen oxide storage catalyst according to embodiments of the present invention, said total loading may range from 0.25 to 5 g/ft$^3$. According to a preferred embodiment, the total loading of Rh ranges from 0.5 to 5 g/ft$^3$, more preferably from 1 to 3 g/ft$^3$, more preferably from 1.25 to 2.75 g/ft$^3$, more preferably from 1.5 to 2.5 g/ft$^3$, and even more preferably from 1.75 to 2.25 g/ft$^3$.

Concerning the total loading of the second washcoat layer according to the present invention, any possible loading may be chosen in principle. In general, the loading of the second washcoat layer in the nitrogen oxide storage catalyst may range from 0.05 to 5 g/in$^3$, preferably from 0.1 to 2 g/in$^3$, more preferably from 0.2 to 1.5 g/in$^3$, more preferably from 0.3 to 1 g/in$^3$, more preferably from 0.4 to 0.6 g/in$^3$, and even more preferably from 0.45 to 0.55 g/in$^3$. According to embodiments of the present invention, it is particularly preferred that the loading of the second washcoat layer in the portion of the catalyst containing the second washcoat layer is less than the loading of the first washcoat layer onto which it is disposed.

According to embodiments of the present invention, it is further preferred that the second washcoat layer comprises metal oxide support particles on which Rh is at least partially supported.

In principle, any metal oxide particles may be used in the second washcoat layer, wherein metal oxide support particles are preferred which comprise at least one metal oxide selected from the group consisting of alumina, zirconia, zirconia-alumina, baria-alumina, lanthana-alumina, lanthana-zirconia-alumina, and mixtures thereof, preferably wherein the metal oxide support particles comprise zirconia-alumina and/or lanthana-alumina, more preferably zirconia-alumina.

As for the metal oxide particles of the first washcoat layer, the metal oxide support particles comprised in the second washcoat layer may be doped with one or more compounds. Thus, the metal oxide support particles, preferably alumina, comprised in the second washcoat layer are preferably doped with zirconia. In principle the metal oxide support particles of the second washcoat layer may be doped with any possible amount of zirconia, wherein the metal oxide support particles are preferably doped with 0.5 to 40% zirconia, more preferably with from 1 to 30%, more preferably with from 5 to 25%, and even more preferably with from 10 to 20% zirconia.

According to particularly preferred embodiments of the present invention, the first and second washcoat layer of the nitrogen oxide storage catalyst comprise alumina doped with zirconia, wherein more preferably alumina comprised in the first washcoat layer is alumina doped with from 1 to 30% zirconia, more preferably from 5 to 20%, more preferably from 7 to 15%, more preferably from 8 to 12%, and even more preferably from zirconia 9 to 11%, and alumina comprised in the second washcoat layer is alumina doped with from 1 to 50% zirconia, more preferably from 5 to 40%, more preferably from 10 to 30%, more preferably from 15 to 25%, more preferably from 18 to 22%, and even more preferably from zirconia 19 to 21%.

According to the present invention, it is further preferred that the particle size ($d_{90}$) of the metal oxide support particles comprised in the second washcoat layer ranges from 5 to 20 µm, preferably from 8 to 14 µm, more preferably from 9 to 13 µm, and even more preferably from 10 to 12 µm.

According to the present invention, embodiments are further preferred wherein a third washcoat layer is disposed onto at least a portion of the first washcoat layer onto which the second washcoat layer is not disposed, wherein said third washcoat layer comprises Pd.

In general, the loading of Pd in the third washcoat layer may have any possible value, wherein the loading may range from 5 to 30 g/ft$^3$. According to a preferred embodiment, the loading of Pd in the third washcoat layer ranges from 10 to 25 g/ft$^3$, more preferably from 13 to 21 g/ft$^3$, more preferably from 15 to 19 g/ft$^3$, more preferably from 16 to 18 g/ft$^3$, and even more preferably from 16.5 to 17.5 g/ft$^3$.

Concerning the total loading of the third washcoat layer according to the present invention, any possible loading may be chosen in principle. In general, the loading of the third washcoat layer in the nitrogen oxide storage catalyst may range from 0.05 to 5 g/in$^3$, preferably from 0.1 to 2 g/in$^3$, more preferably from 0.2 to 1.5 g/in$^3$, more preferably from 0.3 to 1 g/in$^3$, more preferably from 0.4 to 0.6 g/in$^3$, and even more preferably from 0.45 to 0.55 g/in$^3$. Furthermore, it is preferred that the loading of the third washcoat layer in the portion of the catalyst containing the third washcoat layer is less than the loading of the first washcoat layer onto which it is disposed.

According to preferred embodiments of the present invention wherein the nitrogen oxide storage catalyst comprises a third washcoat layer, it is preferred that the third washcoat layer comprises substantially no Rh.

In a preferred embodiment of the present invention, Pd comprised in the third washcoat layer is at least partially supported on metal oxide particles.

In principle, any metal oxide support particles may be used in the third washcoat layer, wherein metal oxide support particles are preferred which comprise at least one metal oxide selected from the group consisting of alumina, zirconia, zirconia-alumina, baria-alumina, lanthana-alumina, lanthana-zirconia-alumina, and mixtures thereof, more preferably, wherein the metal oxide particles comprise zirconia-alumina and/or lanthana-alumina, even more preferably zirconia-alumina.

As for the metal oxide particles of the first and second washcoat layers, the metal oxide support particles comprised in the third washcoat layer may be doped with one or more compounds. Thus, the metal oxide support particles, preferably alumina, comprised in the third washcoat layer are preferably doped with zirconia. In principle the metal oxide support particles of the third washcoat layer may be doped with any possible amount of zirconia, wherein the metal oxide support particles are preferably doped with 1 to 50% zirconia, more preferably from 5 to 40%, more preferably from 10 to 30%, more preferably from 15 to 25%, more preferably from 18 to 22%, and even more preferably from zirconia 19 to 21%.

Concerning the preferred substrate of the nitrogen oxide storage catalyst of the present invention which is a honeycomb substrate comprising a plurality of longitudinally extending passages formed by longitudinally extending walls bounding and defining said passages, it is further preferred that said honeycomb substrate comprises alternating inlet and outlet passages, said inlet passages having an open inlet end and a closed outlet end, and said outlet passages having a closed inlet end and an open outlet end, thus forming a wall-flow substrate. With respect to the preferred embodiments of the present invention which comprise such a wall-flow substrate, it will be understood that the loading of the washcoat layers thereon will depend on substrate properties such as porosity and wall thickness.

According to said preferred embodiments, it is further preferred that the first washcoat layer onto 100-x % of the surface of which the second washcoat layer is disposed is the first washcoat layer disposed on the walls of the inlet passages of the honeycomb substrate, wherein the second washcoat layer is preferably disposed on the first portion of said first washcoat layer extending from the inlet end of the honeycomb substrate (front section). According to the present invention it is preferred that said second washcoat layer is provided on the substrate as a continuous layer.

Regarding preferred embodiments of the nitrogen oxide storage catalyst which comprise a third washcoat layer, it is further preferred that the first washcoat layer onto which said third washcoat layer is disposed is the first washcoat layer disposed on the outlet passages of the honeycomb substrate, said third washcoat layer being disposed on at least a portion of said first washcoat layer of the outlet passages of the honeycomb substrate According to a particularly preferred embodiment comprising a wall-flow substrate, the third washcoat layer is disposed on 100-x % of the surface of the first washcoat layer, x ranging from 20 to 80, preferably from 25 to 75, more preferably from 30 to 70, more preferably from 35 to 65, more preferably from 40 to 60, more preferably from 45 to 65, and even more preferably from 48 to 52. Furthermore, said third washcoat layer is preferably disposed on a portion of said first washcoat layer extending from the outlet end of the honeycomb substrate (rear section).

In addition to the above-mentioned nitrogen oxide storage catalyst, an embodiment of the present invention is also directed to a treatment system for an automobile exhaust gas stream. In particular, the treatment system of the present invention comprises a combustion engine which operates periodically between lean and rich conditions;

an exhaust gas conduit in communication with the engine; and a nitrogen oxide storage catalyst according to the present invention provided within the exhaust gas conduit In principle, any conceivable combustion engine may be used in the treatment system of the present invention, wherein preferably a gasoline engine is used, and more preferably a direct injection gasoline engine.

In a gasoline vehicle application, a catalytic device employing a three-way conversion ("TWC") catalyst may be used in conjunction with the nitrogen oxide storage catalyst of the present invention. Such a device may be located within the exhaust gas conduit of the internal combustion engine and will be disposed upstream and/or downstream of the nitrogen oxide storage catalyst. The TWC catalyst typically includes platinum, palladium and rhodium catalytic components dispersed on a high surface area refractory support and may also contain one or more base metal oxide catalytic components such as oxides of iron, manganese or nickel. Such catalysts can be stabilized against thermal degradation by expedients such as impregnating an activated alumina support with one or more rare earth metal oxides such as ceria. Such stabilized catalysts can sustain very high operating temperatures. For example, if a fuel cut technique is utilized, temperatures as high as 1050° C. may be sustained in the catalytic device.

If the catalytic device is employed and is located upstream of the nitrogen oxide storage catalyst of the invention, the catalytic device may be mounted close to the exhaust manifold of the engine. In such an arrangement, the TWC catalyst may warm up quickly and provide for efficient cold start emission control. Once the engine is warmed up, the TWC catalyst will remove HC, CO and NO$_x$ from the exhaust gas stream during stoichiometric or rich operation and HC and CO during lean operation. In one embodiment, the nitrogen oxide storage catalyst is positioned downstream of the catalytic device where the exhaust gas temperature enables maximum NO$_x$ trap efficiency. During periods of lean engine operation, when NO$_x$ passes through the TWC catalyst, NO$_x$ is stored on the nitrogen oxide storage catalyst. The nitrogen oxide is then periodically desorbed and the NO$_x$ is reduced to nitrogen under periods of stoichiometric or rich engine operation. If desired, a catalytic device containing a TWC catalyst may be employed downstream of the nitrogen oxide storage catalyst of the invention. Such a catalytic device may serve to remove further amounts of HC and CO from the exhaust gas stream and, in particular, will provide for efficient reduction of the NO$_x$ to nitrogen under periods of stoichiometric or rich engine operation.

In a diesel vehicle application, the nitrogen oxide storage catalyst according to the present invention may be used in conjunction with a diesel oxidation catalyst (DOC), and a catalyzed soot filter (CSF), where the DOC and CSF are placed either before or after the nitrogen oxide storage catalyst.

Furthermore, embodiments of the treatment system are preferred which, in addition to or alternatively to the three way catalyst, comprise a selective reduction catalyst provided upstream or downstream from the nitrogen oxide storage catalyst, wherein embodiments are preferred with the selective reduction catalyst provided downstream from the nitrogen oxide storage catalyst. According to a particularly preferred embodiment, the treatment system of the present invention comprises both a three way catalyst and a selective reduction catalyst located downstream from the nitrogen oxide storage catalyst, wherein preferably, both the three way catalyst and the selective reduction catalysts are located on the same substrate.

According to certain embodiments of the present invention, the nitrogen storage catalyst may be comprised on separate substrates with respect to the portions or sections of the catalyst which comprise the second washcoat layer, and those which do not comprise the second washcoat layer. With respect to embodiments of the present invention which comprise a third washcoat layer, it is preferred that the nitrogen storage catalyst comprises separate substrates with respect to the portions or sections of the catalyst which comprise the second washcoat layer, and those which comprise the third washcoat layer.

In addition to these embodiments, the present invention also relates to a method for the treatment of automobile engine exhaust gas using the nitrogen oxide storage catalyst of the present invention. More specifically, the method of the present invention includes conducting an automobile engine exhaust gas over and/or through the nitrogen oxide storage catalyst, wherein the automobile engine exhaust gas is preferably conducted through the nitrogen oxide storage catalyst.

Thus, the present invention also concerns a method for the treatment of automobile engine exhaust gas comprising:
(i) providing a nitrogen oxide storage catalyst according to the present invention, and
(ii) conducting an automobile engine exhaust gas stream over and/or through the nitrogen oxide storage catalyst.

In the method of the present invention, it is preferred that the automobile engine exhaust gas is from a gasoline engine, more preferably from a direct injection gasoline engine.

In use, the exhaust gas stream which is contacted with the nitrogen oxide storage catalyst of the present invention is alternately adjusted between lean and stoichiometric/rich operating conditions so as to provide alternating lean operating periods and stoichiometric/rich operating periods. It will be understood that the exhaust gas stream being treated may be selectively rendered lean or stoichiometric/rich either by adjusting the air-to-fuel ratio fed to the engine generating the exhaust or by periodically injecting a reductant into the gas stream upstream of the catalytic trap. For example, the composition of embodiments of the present invention is well suited to treat the exhaust of engines, including diesel engines, which continuously run lean. In such case, in order to establish a stoichiometric/rich operating period, a suitable reductant, such as fuel, may be periodically sprayed into the exhaust immediately upstream of the nitrogen oxide storage catalyst of the present invention to provide at least local (at the nitrogen oxide storage catalyst) stoichiometric/rich conditions at selected intervals. Partial lean-burn engines, such as partial lean-burn gasoline engines, are designed with controls which cause them to operate lean with brief, intermittent rich or stoichiometric conditions.

Thus, according to the method of embodiments of the present invention, it is preferred that the automobile engine is operated periodically between lean and rich conditions.

In addition to the nitrogen oxide storage catalyst described in the foregoing, an aspect of the present invention also relates to a method for its production. In particular, an embodiment of the present invention further relates to a method of producing a nitrogen oxide storage catalyst comprising the steps of:
(i) providing a substrate which is preferably a honeycomb substrate;
(ii) providing a first washcoat layer on said substrate, said first washcoat layer comprising metal oxide support particles and at least one metal compound selected from the group consisting of alkaline earth metal compounds, alkali metal compounds, rare earth metal compounds, and mixtures thereof, at least a portion of said at least one metal compound being supported on the metal oxide support particles;
(iii) drying and/or calcining the coated substrate;
(iv) providing a second washcoat layer comprising Rh on 100-x % of the surface of the first washcoat layer, wherein x ranges from 20 to 80, preferably from 25 to 75, more preferably from 30 to 70, more preferably from 35 to 65, more preferably from 40 to 60, more preferably from 45 to 65, and even more preferably from 48 to 52;
(v) drying and/or calcining the coated substrate.

According to the production method of an embodiment of the present invention, the washcoat layers may be provided on the substrate by any means commonly used in the art, wherein preferably the washcoat is applied to the substrate by a dip coating procedure. In general, the preferred dip coating procedure may be conducted once to apply the washcoat layer in question, and may be repeated as many times as necessary for achieving the desired loading of said washcoat layer.

Concerning the drying procedure used in the production method of an embodiment of the present invention, the temperature and duration of said procedure are generally chosen such that the resulting dried product is essentially devoid of any solvent employed in the coating procedure.

With respect to the calcining procedure used in the production method of an embodiment of the present invention, the temperature and duration are generally chosen such that a product is obtained which displays the chemical and physical transformations typical to the calcination process. Preferably, the temperature at which the calcination procedure is conducted is comprised in the range of from 450 to 600° C., more preferably of from 500 to 580° C., and even more preferably of from 540 to 560° C. The calcination procedure may be conducted under any suitable atmosphere, wherein the calcination is generally conducted under air.

According to the inventive production method, it is preferred that the metal oxide support particles comprise at least one metal oxide selected from the group consisting of alumina, zirconia, zirconia-alumina, baria-alumina, lanthana-alumina, lanthana-zirconia-alumina, and mixtures thereof, wherein more preferably the metal oxide support particles comprise zirconia-alumina and/or lanthana-alumina, even more preferably zirconia-alumina.

According to a preferred embodiment, step (ii) of the inventive production method comprises the steps of:
(a) mixing a solution of at least one metal compound with particles of at least one metal compound;
(b) drying and/or calcining the mixture to obtain a composite material;
(c) impregnating metal oxide support particles with a solution comprising Pt;
(d) impregnating metal oxide support particles with a solution comprising Pd;

(e) providing and milling a slurry of the particles obtained in steps (c) and (d);

(f) providing a slurry comprising the milled particles obtained in step (e) and the composite material obtained in step (b) and milling the resulting mixture;

(g) coating the substrate with the slurry obtained in step (f).

According to the present invention, it is preferred that the slurry in step (f) contains substantially no Rh.

According to the inventive production process, it is further preferred that in step (a) the at least one metal compound in solution and the at least one metal compound present as particles do not contain the same metals, wherein more preferably the at least one metal compound in solution comprises Ba, and the at least one metal compound in particle form comprises Ce, more preferably, wherein said particles comprise ceria.

Regarding the calcining procedure used in step (b), the temperature employed therein is preferably comprised in the range of from 500 to 800° C., more preferably of from 600 to 750° C., and even more preferably of from 680 to 720° C.

With respect to the impregnation of metal oxide support particles with platinum group metal containing solutions in steps (c) and/or (d) of the preferred method, said procedure may be conducted in any known manner, provided that the platinum group metal respectively comprised therein may be effectively supported onto the metal oxide support particles. Preferably, this is achieved by an incipient wetness procedure.

According to a further embodiment of the present production method, a solution comprising the platinum group metals according to steps (c) and (d) may be directly added together with the metal oxide particles and the composite material obtained in step (b) to form a slurry which is then milled according to step (e). Thus, according to an alternative embodiment of the present invention which is preferred, step (ii) comprises the steps of:

(a) mixing a solution of at least one metal compound with particles of at least one metal compound;

(b) drying and/or calcining the mixture to obtain a composite material;

(f') providing a slurry comprising a solution comprising Pt and Pd, metal oxide support particles, and the composite material obtained in step (b) and milling the resulting mixture;

(g) coating the substrate with the slurry obtained in step (f').

Regarding the milling procedure used in preferred embodiments of the inventive production process, said milling may be conducted in any known milling apparatus suited for the milling of particles as used in the present invention, wherein a milling apparatus is preferably employed which may grind the particles down to an average particle size ($d_{90}$) ranging from 5 to 20 μm, preferably from 8 to 14 μm, more preferably from 9 to 13 μm, and even more preferably from 10 to 12 μm.

According to preferred embodiments of the inventive method, a slurry is provided for the milling and the application of the components comprised in the respective washcoat layers onto the substrate. In general, the slurry employed in the preferred embodiments of the inventive method may be provided according to any method known in the art using any suitable solvent, wherein aqueous solvents and in particular water, preferably as distilled water, are preferably used.

According to the inventive production method, it is further preferred that step (iv) comprises the steps of:

(aa) impregnating metal oxide support particles with a solution comprising Rh;

(bb) providing and milling a slurry of the impregnated particles;

(cc) coating the substrate with the slurry obtained in step (bb).

Concerning steps (aa), (bb), and (cc) of said preferred embodiment, it is further preferred that these respectively be conducted in the same fashion as steps (c) or (d), i.e. with respect to step (aa), (e), i.e. with respect to step (bb), and (g), i.e. with respect to step (cc).

According to a preferred embodiment, the inventive further comprises the steps of:

(vi) providing a third washcoat layer onto at least a portion of the surface of the first washcoat layer, onto which the second washcoat layer has not been provided; (vii)

drying and/or calcining the coated substrate.

Furthermore, according to said preferred embodiment, the steps (vi) and (vii) may either be conducted after step (v) or, alternatively, after step (iii) and prior to step (iv) of the inventive production method.

Furthermore, according to a particularly preferred embodiment, step (vi) comprises the steps of:

(dd) impregnating metal oxide support particles with a solution comprising Pd;

(ee) providing and milling a slurry of the impregnated particles;

(ff) coating the substrate with the slurry obtained in step (ee).

As for steps (aa), (bb) and (cc), it is further preferred that steps (dd), (ee), and (ff) respectively be conducted in the same fashion as steps (c) or (d), with respect to step (dd), (e), with respect to step (ee), and (g) with respect to step (ff).

According to the preferred embodiments of the inventive production method, it is further preferred that in steps (aa) and/or (dd) the metal oxide support particles are impregnated by an incipient wetness procedure. Furthermore, it is preferred that in steps (g), (cc) and/or (ff) the coating is achieved by dip coating.

According to embodiments of the inventive production method which are further preferred, the substrate is a honeycomb substrate, and the method comprises a further step of:

(viii) alternatively closing the inlet our outlet ends of the honeycomb substrate to form inlet passages having an open inlet end and a closed outlet end, and outlet passages having a closed inlet end and an open outlet end.

According to the inventive method, it is particularly preferred that in steps (e), (f), (f'), (bb) and/or (ee) the slurry is milled to a particle size ($d_{90}$) ranging from 5 to 20 μm, preferably from 8 to 14 μm, more preferably from 9 to 13 μm, and even more preferably from 10 to 12 μm.

Even when not explicitly mentioned, the inventive method for the production of a nitrogen oxide storage catalyst is to be understood as comprising all of the features obviously necessary for obtaining the nitrogen oxide storage catalyst of the present invention, in particular with respect to the type and amount as well as with respect to the chemical and physical properties of the individual components comprised therein.

In addition to this, the present invention relates to the products of the inventive production method per se, in particular with respect to the chemical and physical properties of a nitrogen oxide storage catalyst which is obtainable according to said method. Therefore, the present invention also relates to a nitrogen oxide catalyst obtainable according to the inventive method of producing a nitrogen oxide storage catalyst.

EXAMPLES

Comparative Example 1

Preparation of the Nox-Trap Layer

BaCO3 and CeO2 were intimately mixed and finely dispersed in a weight ratio of 1:4. To this purpose, cerium oxide having a BET surface area of from 150 m2/g was mixed with a solution of barium acetate such that the BaCO3/CeO2 composite had a BaCO3 content of from 25 wt.-%. After mixing, the suspension of soluble barium acetate and CeO2 was then dried at a temperature of from 120° C. to obtain a solid mixture of barium acetate and ceria.

After drying, the mixture was then heated at 700° C. for 2 hours to form particles of ceria having barium carbonate supported on the ceria particles. The resulting BaCO3 had an average crystallite size of from about 25 nm and the ceria had an average crystallite size of 10 nm. The BaCO3/CeO2 composite formed particles with an average size of from about 10 microns. The BET surface area of the particulate mixture is 50 m2/g.

Preparation of Catalytic Component

To provide a fully formulated NOx storage catalyst or catalytic trap as described above, in addition to the manufacture of barium carbonate supported on ceria, a precious metal is supported on a refractory oxide according to the following procedure.

Pt and Rh are impregnated onto Al2O3 by an incipient wetness procedure to yield 1.8 wt.-% Pt and 0.3 wt.-% Rh. Pd is impregnated separately onto alumina to a Pd loading of 1.4 wt.-%. In both cases, the alumina had a BET surface area of 200 m2/g and contained 10 wt.-% zirconia.

A mixture of 1.65 g/in3 of the Pt/Rh alumina and 0.4 g/in3 Pd on alumina was prepared. A solution of zirconium acetate with a content of 0.2 g/in3 was added, giving a slurry with a solid content of 45%. This slurry was milled with a ball mill until a particle size of 12 micron (d90) was obtained. Magnesium acetate was added to the slurry and stirred to dissolve, yielding 0.6 g/in3 magnesium oxide. To this mixture, 3.4 g/in3 of the BaCO3/CeO2 composite particles is added and the slurry is milled at pH 6.5-7 until a particle size of 11 micron (d90) is obtained.

Coating of a Substrate

A ceramic honeycomb substrate was coated with the slurry in a dip coating manner and then dried in a dryer and subsequently calcined in a furnace under air at 550° C. The coating procedure was then repeated until a loading of 6.3 g/in3 is achieved.

The final nitrogen oxide storage catalyst displays a platinum loading of 72 g/ft3, a rhodium loading of 3.6 g/ft3, and a palladium loading of 14.4 g/ft3.

Example 2

Samples according to the present example were prepared with the addition of a second layer, as described below.

Pt is impregnated onto Al2O3 by an incipient wetness procedure to yield 1.8 wt.-% Pt. Pd is impregnated separately onto alumina to a Pd loading of 0.2 wt.-%. In both cases, the alumina had a BET surface area of 200 m2/g and contained 10 wt.-% zirconia.

A mixture of 1.5 g/in3 of the Pt alumina and 0.4 g/in3 Pd on alumina was prepared. A solution of zirconium acetate with a content of 0.15 g/in3 was added, giving a slurry with a solid content of 42%. This slurry was milled with a ball mill until a particle size of 12 micron (d90) was obtained. Magnesium acetate was added to the slurry and stirred to dissolve, yielding 0.4 g/in3 magnesium oxide. To this mixture, 3.3 g/in3 of BaCO3/CeO2 composite particles obtained according to the procedure of Comparative Example 1 was added and the slurry was milled at pH 5-6 until a particle size of 11 micron (d90) is obtained.

Coating of a Substrate

A ceramic honeycomb substrate was coated with the slurry in a dip coating manner and then dried in a dryer and subsequently calcined in a furnace under air at 550° C.

The coating procedure is then repeated until a loading of from 5.8 g/in3 is achieved.

Preparation of a Second Layer

A precious metal is impregnated onto alumina with a BET surface area of 180 m2/g. The alumina is doped with 20 wt.-% zirconia. Rhodium nitrate is impregnated onto the alumina to yield 0.5 wt.-% Rh. After impregnation, the alumina slurry is diluted to 35% solids with water. The pH is adjusted to 3.5 to 4 using tartaric acid. The slurry is then milled to about 12 micron (d90) with a continuous mill. Subsequently, the pH is adjusted to 6.5 using MEA.

To create the second, or subsequent layer, the coated substrate is coated again with the slurry in a dip coating manner and then dried in a dryer. The substrate is then calcined in a furnace under air at 550° C. The coating procedure yields the additional coat with a loading of 0.5 g/in3.

The overall coating weight of the first and second washcoat layers in the final nitrogen oxide storage catalyst containing said layers is 6.3 g/in3.

The final nitrogen oxide storage catalyst displays a platinum loading of 70 g/ft3, a rhodium loading of 4 g/ft3, and a palladium loading of 10 g/ft3.

Example 3

Samples according to the present example were prepared with the addition of a second layer (the "third washcoat layer" according to the invention), as described below.

Pt is impregnated onto Al2O3 by an incipient wetness procedure to yield 1.8 wt.-% Pt. Pd is impregnated separately onto alumina to a Pd loading of 0.2 wt.-%. In both cases, the alumina had a BET surface area of 200 m2/g and contained 10 wt.-% zirconia.

A mixture of 1.5 g/in3 of the Pt alumina and 0.4 g/in3 Pd on alumina was prepared. A solution of zirconium acetate with a content of 0.15 g/in3 was added, giving a slurry with a solid content of 42%. This slurry was milled with a ball mill until a particle size of 12 micron (d90) was obtained. Magnesium acetate was added to the slurry and stirred to dissolve, yielding 0.4 g/in3 magnesium oxide. To this mixture, 3.3 g/in3 of BaCO3/CeO2 composite particles obtained according to the procedure of Comparative Example 1 was added and the slurry was milled at pH 5-6 until a particle size of 11 micron (d90) is obtained.

Coating of a Substrate

A ceramic honeycomb substrate was coated with the slurry in a dip coating manner and then dried in a dryer and subsequently calcined in a furnace under air at 550° C.

The coating procedure is then repeated until a loading of from 5.8 g/in3 is achieved.

Preparation of a Second Layer (the "Third Washcoat Layer" According to the Invention)

A precious metal is impregnated onto alumina with a BET surface area of 180 m2/g. The alumina is doped with 20 wt.-% of zirconia. Palladium nitrate is impregnated onto the alumina to yield 0.5 wt.-% Pd. After impregnation, the alumina slurry is diluted to 35% solids with water. The pH is adjusted to 3.5 to 4 using tartaric acid. The slurry is then milled to about 12 micron (d90) with a continuous mill. Subsequently, the pH is adjusted to 6.5 using MEA.

To create the second, or subsequent layer, the coated substrate is coated again with the slurry in a dip coating manner and then dried in a dryer. The substrate is then calcined in a furnace under air at 550° C. The coating procedure yields the additional coat with a loading of 0.5 g/in3.

The overall coating weight of the first and second layer in the final nitrogen oxide storage catalyst is 6.3 g/in3.

The final nitrogen oxide storage catalyst displays a platinum loading of 70 g/ft3 and a palladium loading of 17 g/ft3.

Example 4

Examples 2 and 3 were respectively repeated, wherein the second layer coating according to Example 2 was only provided on 50% of the first layer coating, such that 50% of the front section of the honeycomb substrate relative to the longitudinally extending passages was coated therewith, and the second layer coating (the "third washcoat layer" according to the invention) according to Example 3 was provided on the remaining 50% of the first layer coating which had not been coated with a second layer coating according to Example 2, such that 50% of the rear section of the honeycomb substrate was coated therewith.

The final nitrogen oxide storage catalyst displays a rhodium loading of 4 g/ft3 in the front section of the catalyst containing the second layer coating according to Example 2, of 0 g/ft3 in the section of the catalyst containing the second washcoat layer (the "third washcoat layer" according to the invention) according to Example 3, and a total loading of rhodium in the catalyst of 2 g/ft3. The palladium loading is of 10 g/ft3 in the front section of the catalyst containing the second layer coating according to Example 2, of 17 g/ft3 in the section of the catalyst containing the second washcoat layer (the "third washcoat layer" according to the invention) according to Example 3, and a total loading of palladium in the catalyst of 13.5 g/ft3.

Example 5

Example 2 and Comparative Example 1 (modification: no impregnation with Rh) were respectively repeated, wherein the layer coatings according to Example 2 were only provided on 50% of the honeycomb substrate, such that 50% of the front section of the honeycomb substrate relative to the longitudinally extending passages was coated according to Example 2, and the single layer coating according to the modified Comparative Example 1 was provided on the 50% of the honeycomb substrate which had not been coated with the layer coatings according to Example 2, such that 50% of the rear section of the honeycomb substrate was coated therewith.

NOx Storage Capacity Testing

Catalytic traps were evaluated after aging for 25 hours at 800° C., as follows. An engine was set to an air/fuel ratio of 11.6 for 2 minutes at the desired temperature to remove all stored NOx and oxygen from the catalyst. This mode represents rich engine operation. Subsequently, the engine was adjusted to an air/fuel ratio of 29.6 under constant NOx mass flow. This mode represents lean engine operation. During the whole test, the NOx concentration was measured before and after the NOx trap using a NOx analyzer.

$$U = \frac{NO_x^{massoutlet}}{NO_x^{massinlet}} \cdot 100 \tag{1}$$

After the 2 minute rich operation followed by a lean operation which was terminated if a concentration of 100 ppm NOx or 40 ppm NOx was measured at the tailpipe (i.e. after the NOx trap), respectively. In that case the engine was operated under rich conditions to remove stored NOx. Hydrocarbon and carbon monoxide tailpipe emissions were avoided by the HEGO sensor at the tailpipe: If the HEGO voltage increased over 450 mV, the engine is switched to lean engine operation again. This lean/rich cycle was repeated 10 times to establish constant catalyst conditions. For the time period of the 10 lean/rich cycles the NOx efficiency (U) is calculated from the NOx inlet and NOx outlet concentrations via equation (1): NOx storage mass in g is calculated via equation (2):

$$NO_x^{mass}(g) = \int NO_x * \dot{V}/V_{ideal} * M_S * 1/(3.6*10^6) dt \tag{2}$$

$NO_x$=$NO_x$ concentration (ppm)
V=volume flow (m³/h)
$V_{ideal}$=ideal molar volume (l/mol) at STP
Ms=Molar weight of $NO_2$ (g/mol)
dt=time interval (s)

After the 10 lean/rich cycles, the engine is operated for 1 min rich to remove the stored $NO_x$ completely. Subsequently, the engine is operated under lean condition until no more $NO_x$ is stored in the trap. Under these conditions, the overall $NO_x$ storage capacity is evaluated. However, to achieve a $NO_x$ conversion of greater than 80%, the $NO_x$ storage capacity at high $NO_x$ efficiency is decisive.

As may be taken from the results, the nitrogen oxide catalyst of the present invention displays an improved $NO_x$ storage and conversion efficiency compared to nitrogen oxide storage catalysts of the prior art exemplified by Comparative Example 1. In particular, as may be taken from FIGS. 1 and 2, the application of first and second washcoat layers, as well as the application of first and third washcoat layers according to the present invention respectively leads to an improvement in both the $NO_x$ storage and conversion efficiencies of a nitrogen oxide storage catalyst, in particular at lower temperatures reflecting the "cold start" conditions typically encountered at the beginning of the automotive exhaust gas treatment process.

Figure 1:
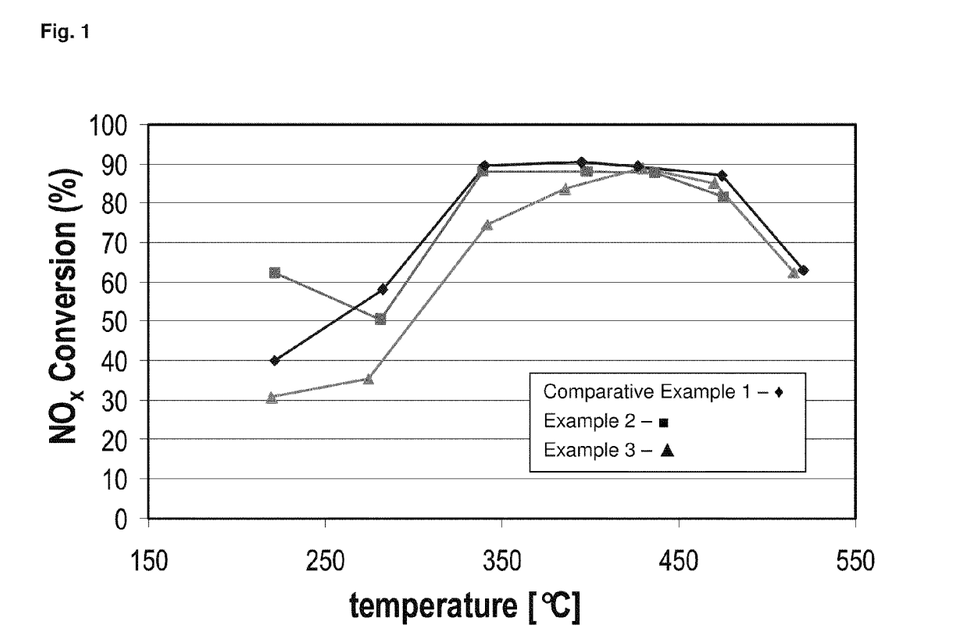

Thus, as may be taken from FIG. 1, a nitrogen oxide storage catalyst comprising a second washcoat layer comprising Rh (Example 2) or a third washcoat layer comprising Pd (Example 3) in addition to a first washcoat layer comprising a nitrogen oxide storage material, respectively leads to a clear improvement in the $NO_x$ conversion efficiency compared to an $NO_x$ storage catalyst according to Comparative Example 1 displaying a single washcoat layer. This improvement is particularly apparent at lower temperatures of the testing process, which reproduces the typical "cold start" environment in automotive exhaust gas treatment. This applies in particular with respect to Example 2, which comprises a topcoat containing Rh.

Figure 2:
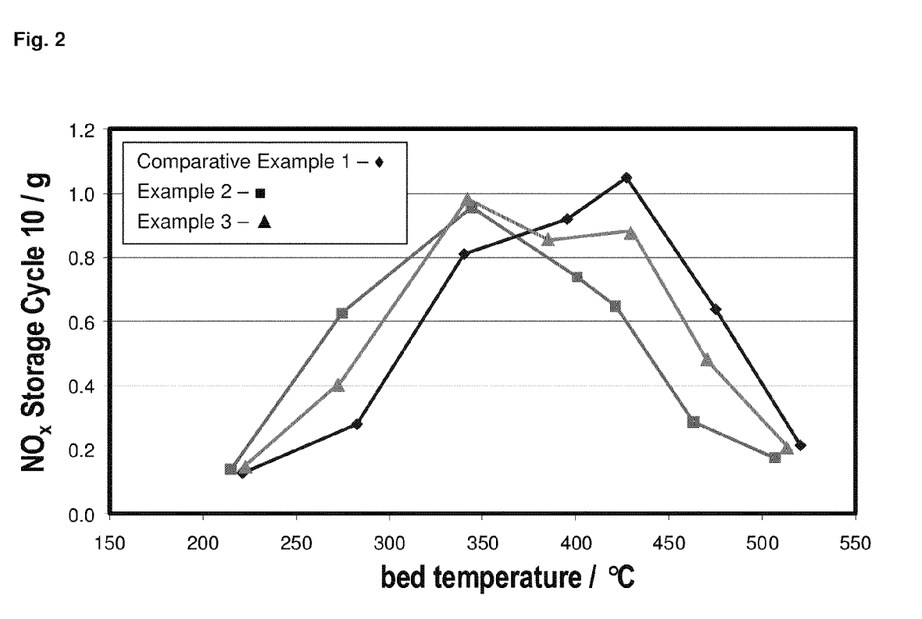
Figure 3:
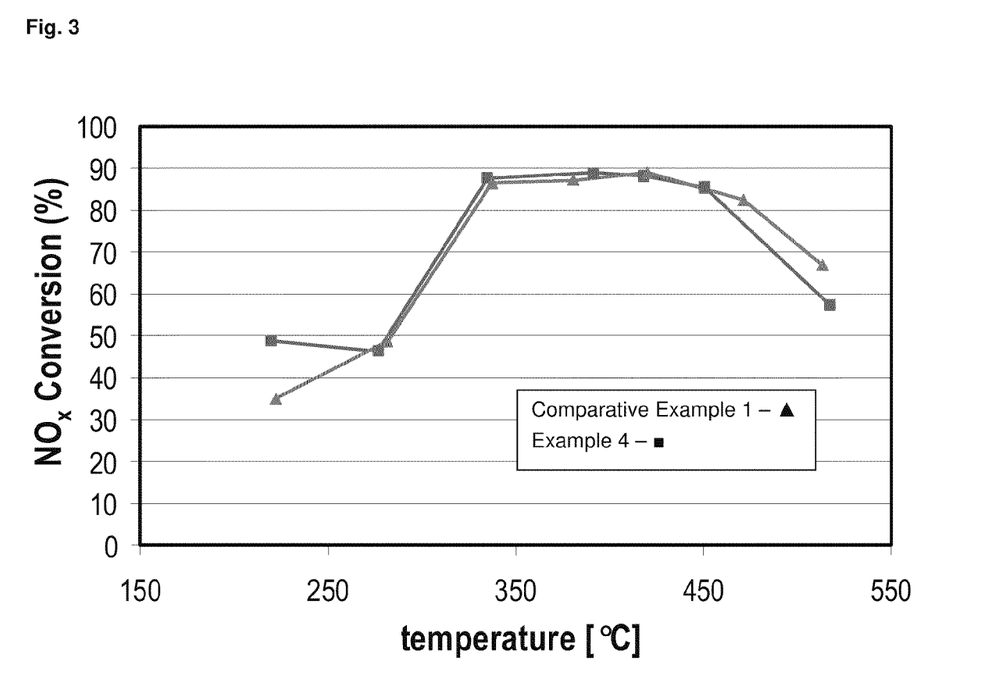
Figure 4:
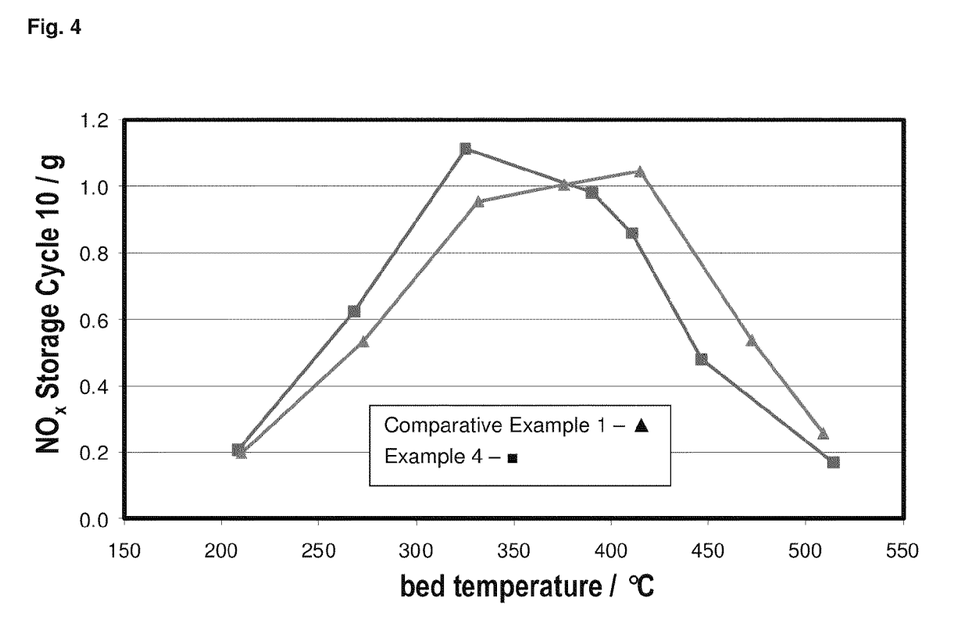
Figure 5:
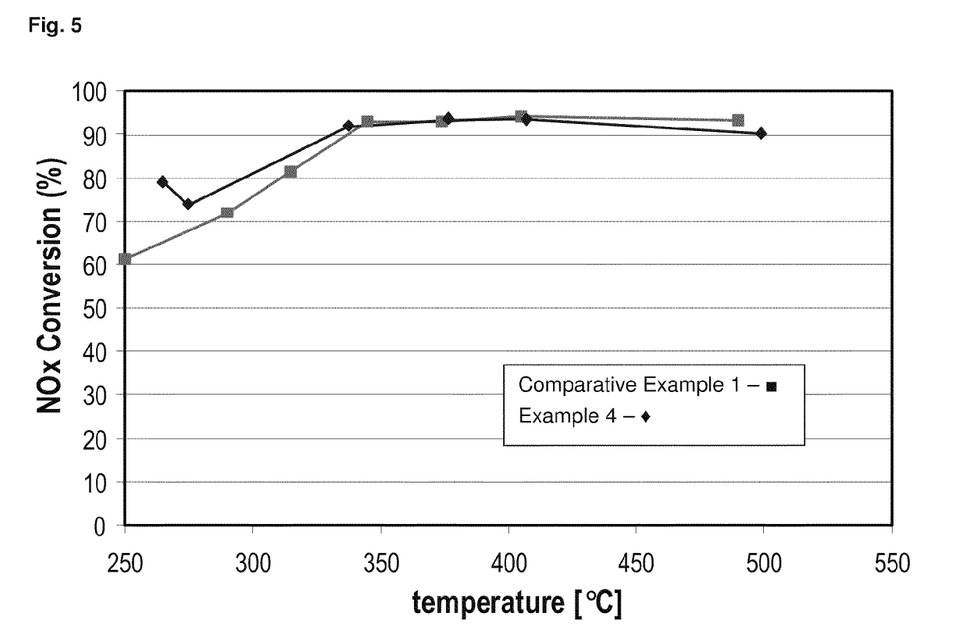
Figure 6:
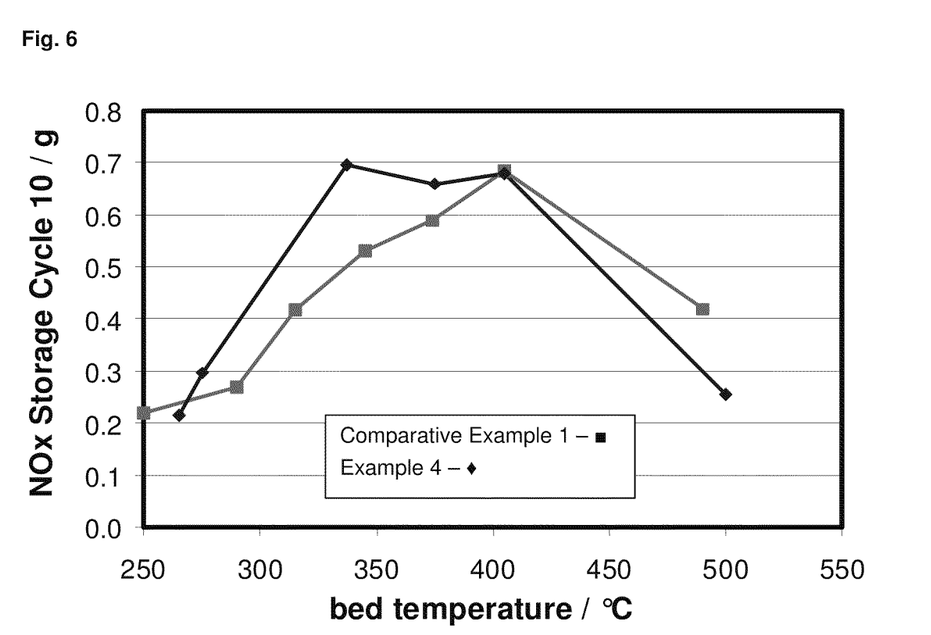

Furthermore, as may be taken from FIG. 2, same respectively applies for the $NO_x$ storage capacities of the $NO_x$ storage catalysts according to Examples 2 and 3 compared to the performance of the $NO_x$ storage catalyst of Comparative Example 1.

Most interestingly, however, as may be taken from FIGS. 3 to 6, the nitrogen oxide storage catalyst of Example 4, which combines the $NO_x$ storage catalyst design of Examples 2 and 3, and thus achieves a particularly reduced total loading of Rh, surprisingly displays a higher efficiency in both $NO_x$ conversion and $NO_x$ storage compared to the $NO_x$ storage catalyst of Comparative Example 1 which contains almost twice the total loading in Rh. Most importantly, said improved efficiency is particularly pronounced at lower testing temperatures reflecting the "cold start" environment in automotive exhaust gas treatment.

Accordingly, as shown from the testing of Example 4, a nitrogen oxide storage catalyst according to the present invention provides an improved catalyst performance in automotive exhaust gas treatment with respect to the abatement of nitrogen oxide, in particular with respect to the critical "cold start" start conditions, in combination with a considerable reduction of the platinum group metals necessary for its performance, in particular with respect to the amount of Rh contained therein.

The invention claimed is:

1. A nitrogen oxide storage catalyst comprising:
   a substrate;
   a first washcoat layer disposed on the substrate, the first washcoat layer comprising metal oxide support particles and a nitrogen oxide storage material comprising at least one metal compound selected from the group consisting of alkaline earth metal compounds, alkali metal compounds, rare earth metal compounds, and mixtures thereof, at least a portion of said at least one metal compound being supported on the metal oxide support particles; and
   a second washcoat layer disposed over the first washcoat layer, said second washcoat layer comprising Rh,
   wherein the first washcoat layer contains substantially no Rh, and
   wherein the second washcoat layer is disposed on 100-x % of the surface of the first washcoat layer, x ranging from 20 to 80.

2. The nitrogen oxide storage catalyst according to claim 1, wherein the first and second washcoat layers are both disposed on the substrate starting from one end and/or side of the substrate body.

3. The nitrogen oxide storage catalyst according to claim 1, wherein the second washcoat layer further comprises metal oxide support particles on which Rh is at least partially supported.

4. The nitrogen oxide storage catalyst according to claim 1, wherein the metal oxide support particles comprise at least one metal oxide selected from the group consisting of alumina, zirconia, zirconia-alumina, baria-alumina, lanthana-alumina, lanthana-zirconia-alumina, and mixtures thereof.

5. The nitrogen oxide storage catalyst according to claim 1, wherein the nitrogen oxide storage material comprises at least one element selected from the group consisting of Li, Na, K, Rb, Cs, Mg, Ca, Sr, Ba, Ce, La, Pr, Nd, and mixtures thereof.

6. The nitrogen oxide storage catalyst according to claim 1, wherein the nitrogen oxide storage material comprises a cerium compound and a barium compound.

7. The nitrogen oxide storage catalyst according to claim 1, wherein the first washcoat layer further comprises at least one platinum group metal selected from the group consisting of platinum, palladium, iridium, and mixtures thereof.

8. The nitrogen oxide storage catalyst according to claim 7, wherein the first washcoat layer comprises Pd and/or Pt.

9. The nitrogen oxide storage catalyst according to claim 1, wherein the nitrogen oxide storage catalyst further comprises a third washcoat layer which comprises Pd and which is disposed onto at least a portion of the first washcoat layer, onto which the second washcoat layer is not disposed.

10. The nitrogen oxide storage catalyst according to claim 9, wherein Pd comprised in the third washcoat layer is at least partially supported on metal oxide support particles.

11. The nitrogen oxide storage catalyst according to claim 1, wherein the substrate comprises a honeycomb substrate comprising a plurality of longitudinally extending passages formed by longitudinally extending walls bounding and defining said passages.

12. The nitrogen oxide catalyst according to claim 11, wherein the first washcoat layer onto 100-x % of the surface of which the second washcoat layer is disposed is the first washcoat layer disposed on the walls of the inlet passages of the honeycomb substrate.

13. The nitrogen oxide catalyst according to claim 11, wherein the nitrogen oxide storage catalyst comprises a third washcoat layer which comprises Pd and which is disposed onto at least a portion of the first washcoat layer, onto which the second washcoat layer is not disposed, and
   wherein the first washcoat layer onto the surface of which the third washcoat layer is disposed is the first washcoat layer disposed on the outlet passages of the honeycomb substrate, said third washcoat layer being disposed on at least a portion of said first washcoat layer of the outlet passages of the honeycomb substrate.

14. A treatment system for an automobile exhaust gas stream, comprising:
   a combustion engine which operates periodically between lean and rich conditions;
   an exhaust gas conduit in communication with the engine; and
   a nitrogen oxide storage catalyst according to claim 1 provided within the exhaust gas conduit.

15. The treatment system according to claim 14, wherein the nitrogen storage catalyst comprises separate substrates with respect to the portions or sections of the catalyst which comprise the second washcoat layer, and those which do not comprise the second washcoat layer.

16. A method for the treatment of automobile engine exhaust gas comprising:
   (i) providing a nitrogen oxide storage catalyst according to claim 1, and
   (ii) conducting an automobile engine exhaust gas stream over and/or through the nitrogen oxide storage catalyst.

17. The method according to claim 16, wherein the automobile engine operates periodically between lean and rich conditions.

18. A method of producing a nitrogen oxide storage catalyst comprising the steps of:
   (i) providing a substrate, preferably a honeycomb substrate;
   (ii) providing a first washcoat layer on said substrate, said first washcoat layer comprising metal oxide support particles and at least one metal compound selected from the group consisting of alkaline earth metal compounds, alkali metal compounds, rare earth metal compounds, and mixtures thereof, at least a portion of said at least one metal compound being supported on the metal oxide support particles;
   (iii) drying and/or calcining the coated substrate;
   (iv) providing a second washcoat layer comprising Rh on 100-x % of the surface of the first washcoat layer, wherein x ranges from 20 to 80;
   (v) drying and/or calcining the coated substrate.

19. The method of claim 18, further comprising the steps of:
- (vi) providing a third washcoat layer onto at least a portion of the surface of the first washcoat layer, onto which the second washcoat layer has not been provided;
- (vii) drying and/or calcining the coated substrate;

wherein alternatively, steps (vi) and (vii) are conducted after step (iii) and prior to step (iv).

20. The method according to claim 19, wherein step (ii) comprises the steps of:
- (a) mixing a solution of the at least one metal compound with particles of at least one metal compound;
- (b) drying and/or calcining the mixture to obtain a composite material;
- (c) impregnating metal oxide support particles with a solution comprising Pt;
- (d) impregnating metal oxide support particles with a solution comprising Pd;
- (e) providing and milling a slurry of the particles obtained in steps (c) and (d);
- (f) providing a slurry comprising the milled particles obtained in step (e) and the composite material obtained in step (b) and milling the resulting mixture;
- (g) coating the substrate with the slurry obtained in step (f).

21. The method according to claim 20, wherein step (iv) comprises the steps of:
- (aa) impregnating metal oxide support particles with a solution comprising Rh;
- (bb) providing and milling a slurry of the impregnated particles;
- (cc) coating the substrate with the slurry obtained in step (bb).

22. The method according to claim 21, wherein step (vi) comprises the steps of:
- (dd) impregnating metal oxide support particles with a solution comprising Pd;
- (ee) providing and milling a slurry of the impregnated particles;
- (ff) coating the substrate with the slurry obtained in step (ee).

23. The method according to claim 22, wherein in steps (e), (f), (bb) and/or (ee) the slurry is milled to a particle size ($d_{90}$) ranging from 5 to 20 μm, preferably from 8 to 14 μm, more preferably from 9 to 13 μm, and even more preferably from 10 to 12 μm.

24. The method according to claim 22, wherein in steps (c), (d), (aa) and/or (dd) the metal oxide support particles are impregnated by an incipient wetness procedure.

25. The method according to claim 22, wherein in steps (g), (cc) and/or (ff) the coating is performed by dip coating.

26. The method according to claim 20, wherein the slurry in step (f) contains substantially no Rh.

27. The method according to claim 19, wherein the substrate is a honeycomb substrate, and wherein the method preferably comprises a further step of:
- (viii) alternatively closing the inlet our outlet ends of the honeycomb substrate to form inlet passages having an open inlet end and a closed outlet end, and outlet passages having a closed inlet end and an open outlet end.

28. A nitrogen oxide storage catalyst obtainable by a method according to claim 18.

* * * * *